United States Patent [19]

Prey

[11] Patent Number: 4,837,810

[45] Date of Patent: Jun. 6, 1989

[54] TELEPHONE SWITCH CENTER WITH CONTROL OF INDIVIDUAL DEVICES

[75] Inventor: Gerhard Prey, Eichenau, Fed. Rep. of Germany

[73] Assignee: Siemens Aktiengesellschaft, Berlin and Munich, Fed. Rep. of Germany

[21] Appl. No.: 165,857

[22] Filed: Mar. 9, 1988

[30] Foreign Application Priority Data

Mar. 18, 1987 [DE] Fed. Rep. of Germany ....... 3708833

[51] Int. Cl.⁴ ............................................. H04M 3/00
[52] U.S. Cl. .................................. 379/242; 379/279; 379/333; 371/3
[58] Field of Search ................... 371/3; 379/242, 333, 379/334, 279; 370/13, 85; 178/17.5, 69 L, 69 G, 69 H

[56] References Cited

U.S. PATENT DOCUMENTS 4,754,480 6/1988 Mattis et al. ..................... 379/333 X

FOREIGN PATENT DOCUMENTS 0199933 11/1986 European Pat. Off. .
1562230 3/1970 Fed. Rep. of Germany .

OTHER PUBLICATIONS

"Telcom Report", 5 (1982), No. 4, pp. 262–266, Digital Concentrators in the EWSD Telephone Switching System, Frieser et al.

*Primary Examiner*—James L. Dwyer
*Attorney, Agent, or Firm*—Adel A. Ahmed

[57] ABSTRACT

After connecting a device to the switching device through device-specific connect command and transmission of a start command as well as transmission back of a start command acknowledgement signal, the connect command is partially or slightly changed and transmitted again, whereupon the switching device transmits a stop command to the particular device. The stop command is responded to by the particular device with a stop command acknowledgement signal transmitted back only, if after established connection it has received a start command before a stop command. The activation error is recognized in that after output of the changed connect command and the stop command transmitted thereupon each time, a stop command acknowledgement signal arrives in the switching device.

1 Claim, 1 Drawing Sheet

TELEPHONE SWITCH CENTER WITH CONTROL OF INDIVIDUAL DEVICES

BACKGROUND OF THE INVENTION

The invention relates to a circuit arrangement for telecommunication installations, including telephone exchange installations, in which individual devices are activated by a central switching device with device-specific connect commands transmittable by the latter to the equipment, and in which, after selecting and connecting the particular device to the switching device, between these two information for ensuring correct connect command transmission to the device as well as for ascertaining of the connection having thereupon been established with the correct device is exchanged, and in which different commands transmitted by the switching device to a connected device are checked command-specifically through acknowledgement signals transmitted back, and in which from the switching device to the particular device after completed connection a start command is transmitted and before or for disconnection, a stop command is transmitted.

The publication "telcom report", 5 (1982) No. 4 (English language edition) pp. 262 describes a circuit arrangement for telecommunications systems, in particular telephone exchange installations, in which individual devices are activated by a central switching network, in that the latter causes an activating device through an address transmitted to the activating device to transmit activation data to a particular device over an activation circuit between it and the activation circuit, with the different devices being activatable over different or partially different activation circuits, and in which through the activation data connecting means in the particular individual device are caused to connect the latter with a common bus line leading to the central switching network. The activation device mentioned in it consists in this known case of a module processor (SLMCP), which is provided for a multiple subscriber connecting circuit (SIM). One such activation device shown in the lower illustration on page 263 of this publication, receives in each instance for the activation of one single individual device (single subscriber connecting circuit SUC/COSLAC) one address from a central switching network (concentrator Processor DICC), by which this activation device is caused to transmit activation data across an activation circuit extending from it to the individual device. The different individual devices are activatable across different or partially different activation circuits. In each instance, therefore, a separate activation circuit, independent of all other activation circuits, can run from the activation device to each of the discrete devices. The activation circuits can, however, also be provided partially in common for the different discrete devices. In this case, the different individual devices have only partially different activation circuits. One such arrangement is shown, for example, in the German Patent No. 1 562 230. In it, a coordinate activation of discrete devices through an activation device is disclosed. In this case, the connecting means are electromagnetic relays with connecting contacts. The connecting means, however, can equally well be realized through switching means functioning purely electronically. As is further apparent in the mentioned illustration on page 263, the connecting means serve to connect an individual device due to its activation with a common bus line leading to the central switching network.

The activation of individual devices, can thus take place across device-specific discrete activation circuits or across partially common activiation circuits, as described in the above mentioned German Patent No. 1 562 230 (activation in two coordinates) or also in encoded form, with different codes being applicable, for example, the decimal code or other codes.

The usefulness of an activatable activation device encoded through addresses, which is provided for each of a small number of individual devices and activates each of them across entirely or partially device-specific activation circuits, resides in that the number of the circuits leading from a central switching network can be kept relatively low. When activating individual devices, however, the problem also exists of surveillance of the activation and connection processes taking place faultlessly. If the coded activation addresses transmitted by a central switching network reach the individual devices to be activated, the possibility exists to monitor the correctness of the address transmission by transmitting back the particular received address or the complement of a particular received address or to monitor continuously by activation through address and its complement. Other surveillance possibilities exist, for example, those stated in the already mentioned German patent, with the assumption that the activation circuit lead directly from the central switching network, which runs the activation and connection processes.

From the German Patent (examined) No. 35 12 846 another surveillance method regarding the correct running of the activation and connection processes is known. In it, when activating an individual device in connection with data transmission processes from a central switching device to the individual device, a device-specific indentification marker is transmitted across the particular bus line to this individual device, which is stored here. Each time an individual device is activated by the central switching device, the identification transmitted with it is compared to the identification already stored in the individual device. This comparison can take place in the individual device. Likewise, the possibility also exists of transmitting the identification stored in the individual device to the central switching device and comparing it here with the previously transmitted identification. In both cases this known arrangement requires, that in each of the individual devices activatable by the central switching device an identification is stored, and, in particular, in each instance from one activation process to the next. The individual devices, therefore, must be in a position to store such identifications.

SUMMARY OF THE INVENTION

The problem defined for the invention is to create in a circuit arrangement of the initially stated kind a surveillance possibility, which does not demand that in the activatable individual devices a storage means for device-specific identifications is made available.

The invention solves the posed problem in that after successful connection of a device to the switching network through connect commands and transmission of the start command as well as transmission back of a start command acknowledgement signal, the connect command is one or more times partially or slightly changed, and each time transmitted again, that after each transmission of the changed connect command, the stop command is transmitted by the switching network to the particular device, which has reacted each time to the changed connect command, that each device reacting in this manner responds to the stop command with a stop command acknowledgement signal transmitted back only if after established connection it has received a start command, and that the switching network recognizes an activation error in that it, after transmission of each changed connect command and the stop command transmitted subsequently in each instance receives a stop command acknowledgement signal.

Activated individual devices, therefore, answer all received commands in each instance with a command-specific acknowledgement signal. After their activation, they always first receive a start command each time and respond to it correspondingly with a start command acknowledgement signal. If a stop command is transmitted by the central switching device to a conventionally activated individual device, which after its activation has received a start command, then it responds to the received stop command with a stop command acknowledgement signal. If, however, an activated individual device received a stop command without previously having received a start command, then it does not transmit a stop command acknowledgement signal. As indicated, now after completed activation of an individual device to the switching device with connect command and after transmission of the start command has taken place in the usual manner as well as transmision back of the start command acknowledgement signal, the connect command is changed one or several times partially or slightly. These are changes, which in the case of coded activation addresses used as connect commands consist of single errors, in the case of these coded addresses, thus, of errors involving each time only one single position. In a decimally encoded address, for each position nine error possibilities exist. In a binary coded address, for each position only one single error possibility is given. It is within the meaning of these error possibilities that the above statement is to be understood, that the connect command is partially changed several times. This partial change can possibly also be considered minor. A slight change of a connect command can—in the case of an activation across device—specific activation circuits-consist in that, instead of the correct activation circuit only a spatially adjacent activation circuit is marked. If, for example, all activation circuits lie in a ribbon cable discretely next to each other, a slight change can consist in that instead of an activation circuit originally to be marked, one of the two activation circuit immediately adjacent is marked. The same can equally well take place in a two-coordinate activation corresponding to the already mentioned German Patent No. 1 562 230. If now, due to a single error an individual device is incorrectly activated, be it in a usual and original activation of a device through the switching device or in an activation through partial or slightly changed connect command, then, if upon repeated activation each time the same individual device is reached as in the usual original activation, then subsequent to the stop command a stop command acknowledgement signal is received, on the basis of which it can be recognized, that with two different activation commands one and the same individual device has been reached.

BRIEF DESCRIPTION OF THE DRAWINGS

In the drawing only components of an embodiment of the invention are shown which contribute significantly to its understanding, to which, however, the invention is not limited.

DESCRIPTION OF THE PREFERRED EMBODIMENT

Figure 1:
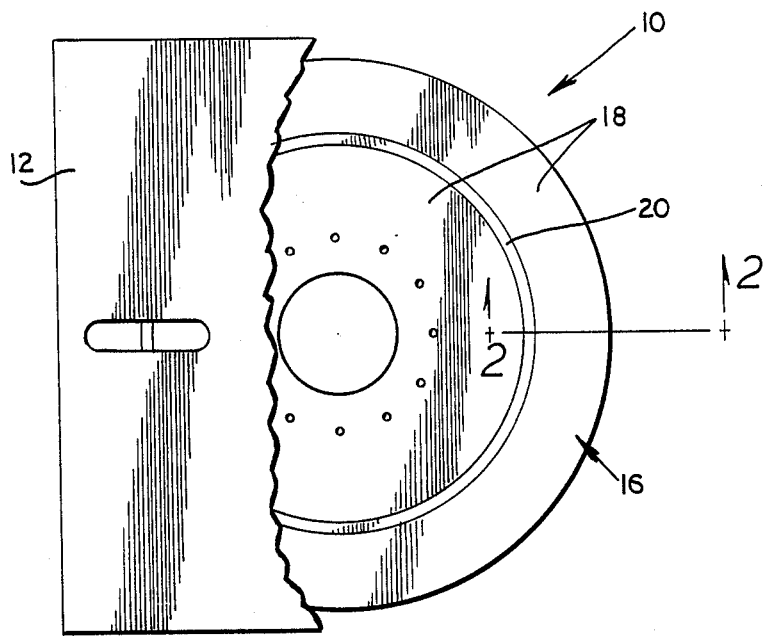

A number of individual devices G1 to Gn are provided, which can be activated by a central switching device C. Activation takes place through device-specific different connect commands transmittable from the switching device C to the devices across an address line A. There are, thus, different connect commands for each individual device and one particular connect command each serves for activating one particular device each.

This address line A can be a single-core or multi-core line. The connect command can be activation addresses transmitted in coded form. The discrete code element of a coded activation address can be transmitted simultaneously in parallel across several line cores or also serially in a time raster across one and the same transmission path within this address line A.

It is also possible that the address line is multi-cored and that activation of the individual devices takes place in the manner as described in the already previously mentioned German Patent No. 1 562 230, thus in a two-coordinate system. Moreoever, the possibility also exists, that for each of the individual devices G1 to Gn in each case an individual, hence, device-specific activation core is provided. In this case it is best to arrange the activation cores in such an activation line in a flat ribbon cable, in which the discrete activation cores are all arranged singly next to each other. For further description of this embodiment it may, however, be assumed that the activation commands are transmitted in encoded form from the switching device C to the devices G1 to Gn, and specifically bit-serially, which means, the discrete code elements of each of the activation addresses discretely sequenced in time.

In the individual devices G1 to Gn address receivers A1 to An are provided. These address receives are so structured in a manner known per se, that they each react only to a single very specific and device-specific activation address. If, therefore, the central switching device C transmits a connect command in the form of a coded activation address across address line A, then this connect command reaches all address receivers A1 to An. Only that address receiver reacts to the address transmitted across address line A, which belongs to the particular individual device about to be activated.

If an address receiver receives the address corresponding to it, then it reacts to it in that it brings a device-specific connecting contact, for example a1 from its shown resting position into the functional position. It can be provided that the connecting contacts are closed for so long, and specifically only for so long, as the particular activation address is transmitted across address line A. But it is also possible to design the address receiver and the connecting relays supporting the connection contacts so that additionally to a connect command, a signal is transmitted across the address line, which brings about that the particular connection contact is closed and that the particular connection contact is opened again in that in connection with the Particular connect command an additional signal is transmitted which effects opening of the particular connection contact.

In the manner described previously, the different devices G1 to Gn can be activated singly, and it can be achieved that each time in a discrete individual device the particular connection contact is closed or respectively opened again. These connection contacts can, of course, also be provided in multiple parallel per individual device. The connection contacts serve to connect device-specific receivers, for example, E1 and transmitters, for example H1, to a central data line B common to all devices. This data line can be multi-cored. Correspondingly, the connection contacts per individual device would also need to be provided multi-parallel, as already mentioned. Across the central data line B in a manner known per se data is transmitted. These data can be coded information, for example, decimally coded data or binary coded data. Data from the central switching device C to the individual devices can be transmitted, where they are received by receivers E1 to En; equally well data from the individual devices can be transmitted to the central switching device. This is provided through device-specific transmitters H1 to Hn.

After each activation and connection of the particular devices to the switching device across the data line B, information between the switching device and the particular device for monitoring the correct connect command output to the device as well as the subsequent connection of the correct device is exchanged. Different commands transmitted from the switching device to the particular connected device are checked command-specific through acknowledgement signals transmitted back. Following completed connection, the switching device transmits initially a start command to the particular device. Each of the devices responds to a received command with an appropriate acknowledgement signal. If, therefore, an activated and connected device, after accepting the connect command, receives a start command, it subsequently transmits automatically a start command acknowledgement signal. This takes place with the device-specific transmitter, for example H1.

After completed activation and connection of an individual device, thus, initially start command and start command acknowledgement signals are exchanged in the stated manner. Subsequent to that, further commands and corresponding acknowledgements signals can be exchanged. A command acknowledgement signal exchange is also ended in that at the end a stop command is transmitted from the switching device to the particular device, to which the latter responds with a stop command acknowledgement signal.

The surveillance of the correct functioning of the address receivers A1 to An including the transmission of the activation addresses across the address line A is of particular significance in the embodiment herein described. Of special importance here is a surveillance of the correct activation and connection in so far that each time an address receiver reacts only to a single activation address, not (due to an error) simultaneously to two different activation addresses, namely such that only differ in one position.

In order to ensure that each of the different individual devices reacts only to one single activation address, and in particular to the activation address assigned to it individually, it is provided that after connection of a device to the switching device with connect commands has taken place, that is, device-specific activation address and transmission of the start command from the switching device to the particular device as well as transmission back of a start command acknowledgement signal from the device to the switching device of the connect command, that is, the binary coded activation address has been changed through the switching device one or several times partially or slightly and each time transmitted again. Under the assumption that the connect commands are binary coded activation addresses, a partial change of one activation address may consist in that each time only one binary signal is changed into the reverse binary signal. If, thus, an activation address consists of a total of eight binary signals, the, for example, eight partially changed activation addresses exist, of which each can be caused by a one bit error during address transmission or address reception or address evaluation. A minor activation address change can consist in that during addressing across one core of a flat ribbon cable or across two cores of two flat ribbon cables (cf. the two-coordinate activation according to the arrangement, which is described in the already mentioned German Patent No. 1 562 230) due to a core closure between two spatially adjacent flat ribbon cable cores except one marked flat ribbon cable core the particular adjacent core is erroneously, that is caused by an error, marked also along with the correct one.

It is now, furthermore, provided that after each transmission of an activation address changed in the indicated manner of the already described stop command from the switching device to the particular device, which as reacted to the connect command changed each time, is transmitted. Each of the devices having reacted to the activation addresses changed singly responds to the stop command with a stop command acknowledgement signal only if, after connection has taken place, it receives a start command before a stop command. Hence, if through an activation address changed each time within the meaning of the invention, actually an individual device different from the individual device originally activated through the correct activation address, then this other device cannot respond to the stop command with a stop command acknowledgement signal, because after connection has taken place it did not receive a start command. In order to ascertain that activation and connection has correctly taken place with a particular connect command, that is with a particular activation address, that is, that no other individual device has erroneously additionally recated to the originally correctly transmitted activation address, the switching device transmits activation addresses sequentially, which all have been generated in each instance through an artificial one bit error, which, thus, have been falsified artificially purely through several such errors. An activation error is recognized by the switching device in that it receives after transmission of a connect command changed each time in the described manner and the transmitted stop command in response to it, a stop command acknowledgement signal. The switching device C can receive such stop command acknowledgement signal under the circumstances only from a device activated by a changed activation address, if this device previously also reacted erroneously to the unchanged transmitted activation address. In the described manner addressing errors, relating to emitting, transmitting, receiving and evaluating of the activation address can be recognized. Surveillance can be limited to changed activation addresses in the sense of one bit errors. But it is also possible to expand the surveillance correspondingly in the same sense to two bit errors.

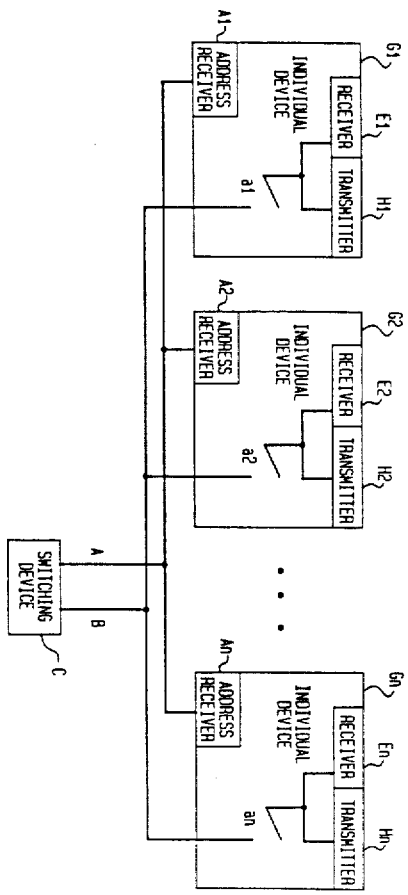

What is claimed is:

1. Circuit arrangement for telecommunication systems, including telephone exchange installations, wherein individual devices are activated by a central switching device with device-specific connect commands transmittable by the latter to the devices, and wherein, after each activation and connection of the particular device to the switching device, information is exchanged between these two for surveillance of correctness of the connect command output to the device as well as the connection of the correct device established thereupon, and in which different commands transmitted from the switching device to a connected device are command-specifically monitored through acknowledgement signals transmitted back, and in which a start command is transmitted from the switching device to the particular device after established connection and a stop command is transmitted before or for the purpose of disconnection, characterized in that after completed connection of a device to the switching device with connect command and transmision of the start command as well as transmission back of a start command acknowledgement signal, the connect command is changed one or several times partially or slightly and each time transmitted again, that after each output of the changed connect command the stop command is transmitted from the switching device to the particular device, which has reacted to the changed connect command, that each device having reacted in this manner, responds to the stop command with a stop command acknowledgement signal transmitted back only, if, after connection has taken place, it has received a start command before a stop command, and that the switching device recognized an activation error in that, after output of the changed connect command and the stop command transmitted thereupon, it receives a stop command acknowledgement signal.

* * * * *

UNITED STATES PATENT AND TRADEMARK OFFICE
CERTIFICATE OF CORRECTION

PATENT NO. : 4,837,810

DATED : June 6, 1989

INVENTOR(S) : Prey

Figure 2:
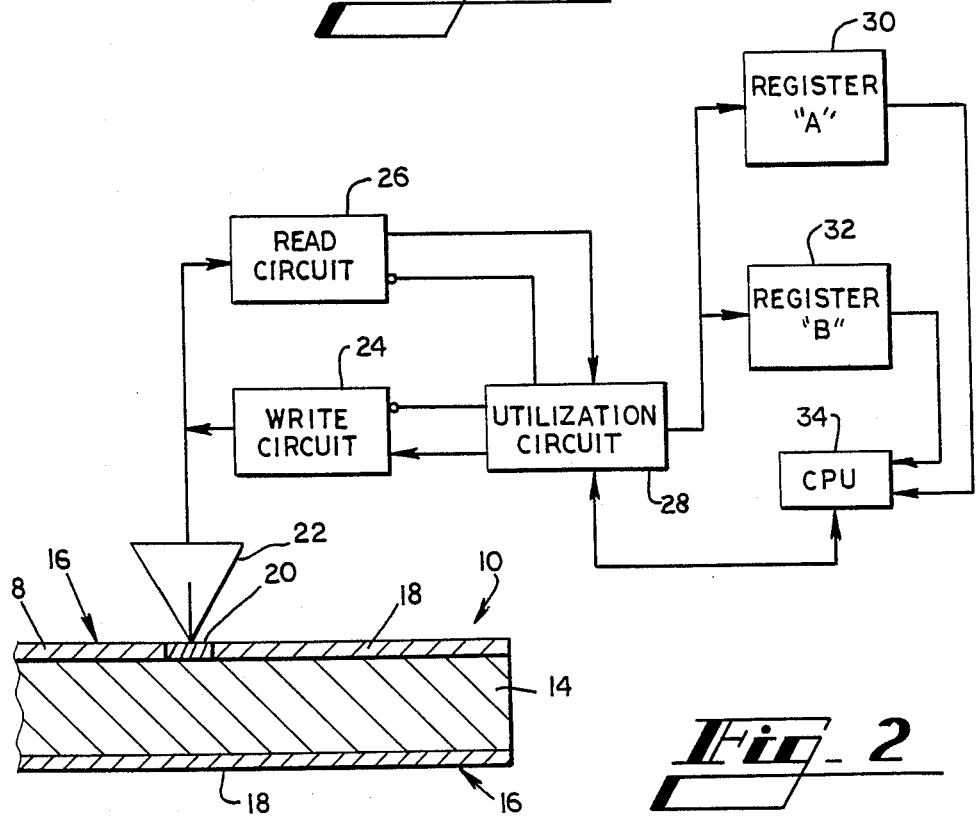
Figure 3:
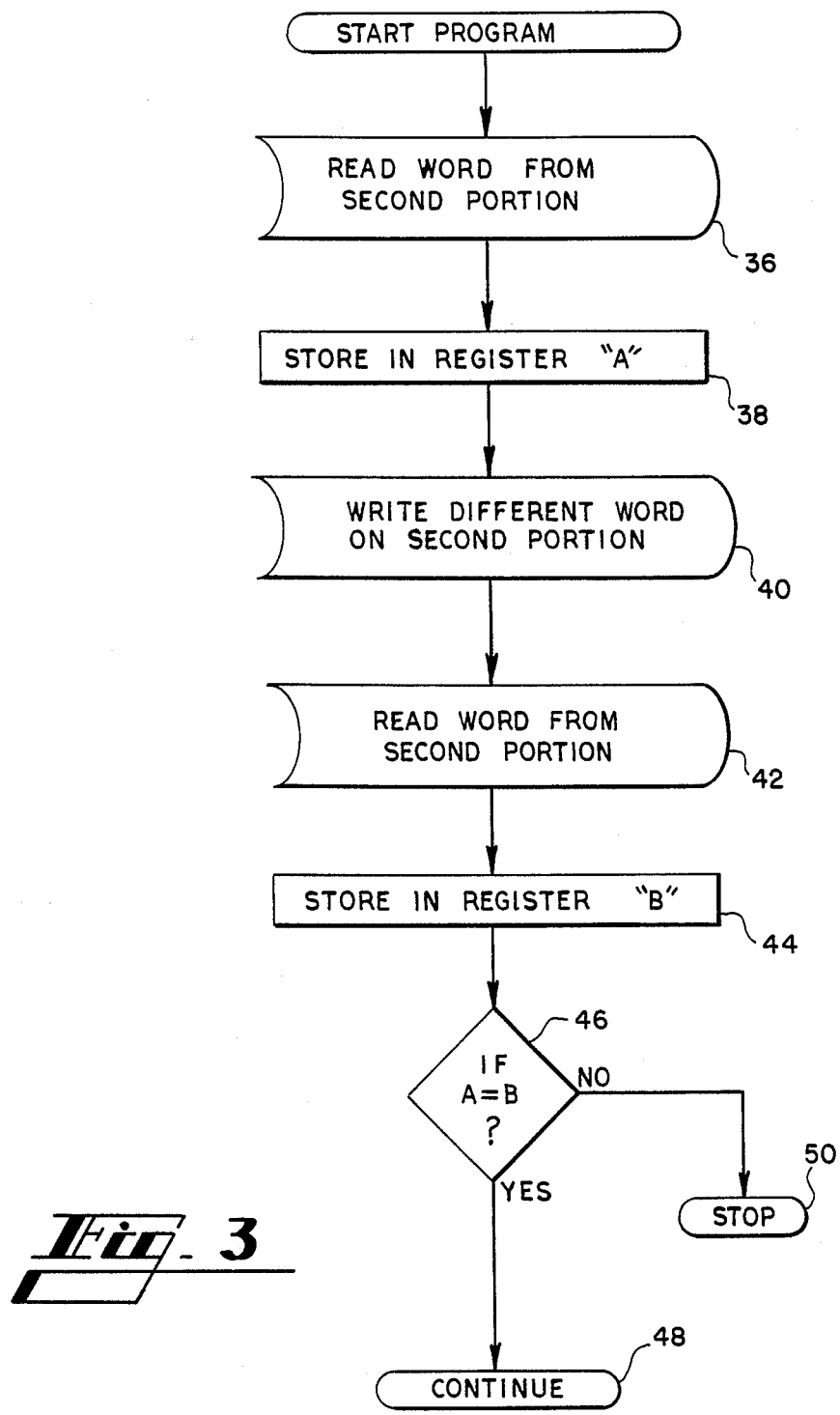

It is certified that error appears in the above—identified patent and that said Letters Patent is hereby corrected as shown below:

Delete Figures 1, 2, and 3 and substitute therefor the attached drawing.

Signed and Sealed this

Nineteenth Day of January, 1993

Attest:

DOUGLAS B. COMER

*Attesting Officer*      Acting Commissioner of Patents and Trademarks

United States Patent [19]

Prey

[11] Patent Number: 4,837,810
[45] Date of Patent: Jun. 6, 1989

[54] TELEPHONE SWITCH CENTER WITH CONTROL OF INDIVIDUAL DEVICES

[75] Inventor: Gerhard Prey, Eichenau, Fed. Rep. of Germany

[73] Assignee: Siemens Aktiengesellschaft, Berlin and Munich, Fed. Rep. of Germany

[21] Appl. No.: 165,857

[22] Filed: Mar. 9, 1988

[30] Foreign Application Priority Data

Mar. 18, 1987 [DE] Fed. Rep. of Germany ....... 3708833

[51] Int. Cl.⁴ .............................................. H04M 3/00
[52] U.S. Cl. .................................. 379/242; 379/279; 379/333; 371/3
[58] Field of Search ................. 371/3; 379/242, 333, 379/334, 279; 370/13, 85; 178/17.5, 69 L, 69 G, 69 H

[56] References Cited

U.S. PATENT DOCUMENTS 4,754,480  6/1988  Mattis et al. ................ 379/333 X

FOREIGN PATENT DOCUMENTS 0199933  11/1986  European Pat. Off. .
1562230   3/1970  Fed. Rep. of Germany .

OTHER PUBLICATIONS

"Telcom Report", 5 (1982), No. 4, pp. 262–266, Digital Concentrators in the EWSD Telephone Switching System, Frieser et al.

Primary Examiner—James L. Dwyer
Attorney, Agent, or Firm—Adel A. Ahmed

[57] ABSTRACT

After connecting a device to the switching device through device-specific connect command and transmission of a start command as well as transmission back of a start command acknowledgement signal, the connect command is partially or slightly changed and transmitted again, whereupon the switching device transmits a stop command to the particular device. The stop command is responded to by the particular device with a stop command acknowledgement signal transmitted back only, if after established connection it has received a start command before a stop command. The activation error is recognized in that after output of the changed connect command and the stop command transmitted thereupon each time, a stop command acknowledgement signal arrives in the switching device.

1 Claim, 1 Drawing Sheet